United States Patent [19]

Stötzel et al.

[11] Patent Number: 5,656,560
[45] Date of Patent: Aug. 12, 1997

[54] BRONZE-TINTED OR GREY-TINTED SODA LIME SILICATE GLASS

[75] Inventors: Eberhard Stötzel, Schermbeck; Ferdinand Klösel, Dorsten, both of Germany; Brian Yale, Lancashire, England

[73] Assignees: Pilkington plc, Merseyside, Great Britain; Flachglas AG, Fürth, Germany

[21] Appl. No.: 223,715

[22] Filed: Apr. 6, 1994

[30] Foreign Application Priority Data

Apr. 6, 1993 [DE] Germany .................... 43 11 180.7

[51] Int. Cl.$^6$ .................................................. C03C 3/078
[52] U.S. Cl. .................................. 501/72; 501/71; 501/70
[58] Field of Search ........................... 501/70, 71, 72

[56] References Cited

U.S. PATENT DOCUMENTS

| | | | |
|---|---|---|---|
| 5,023,210 | 6/1991 | Krumwiede et al. | 501/71 |
| 5,204,293 | 4/1993 | Amundson et al. | 501/72 |
| 5,364,820 | 11/1994 | Morimoto et al. | 501/72 |

FOREIGN PATENT DOCUMENTS 80023221  6/1980  Japan .

*Primary Examiner*—Karl Group
*Attorney, Agent, or Firm*—Sughrue, Mion, Zinn, Macpeak & Seas

[57] ABSTRACT

The invention relates to a bronze-tinted or grey-tinted soda lime silicate glass, in particular for the manufacture of flat glass by the casting process or by the float process, with a basic composition for the soda lime silicate glass of:

| | |
|---|---|
| $SiO_2$: | 66–74 weight % |
| $Al_2O_3$: | 0–3 weight % |
| $TiO_2$: | 0–0.15 weight % |
| CaO: | 7–12 weight % |
| MgO: | 2–6 weight % |
| $Na_2O$: | 10–15 weight % |
| $K_2O$: | 0–3 weight % |
| BaO: | 0–0.04 weight % |
| $SO_3$: | 0.1–0.4 weight % |

The invention resides in the fact that it contains the following colorants additives:

| | |
|---|---|
| $Fe_2O_3$: | 0–0.45 weight % |
| $V_2O_5$: | 0.0–0.5 weight % |
| $MnO_2$: | 0.5–2 weight % |
| NiO: | 0.0–0.05 weight % |
| CuO: | 0.0–0.1 weight % |
| CoO: | 0.0–0.008 weight % | the sum of the weight percentages of the constituents forming the soda lime silicate glass being 100.

9 Claims, 7 Drawing Sheets

BRONZE-TINTED OR GREY-TINTED SODA LIME SILICATE GLASS

The invention concerns a bronze-tinted or grey-tinted soda lime silicate glass, in particular for the manufacture of flat glass by the casting process or by the float process, with a basic composition for the soda lime silicate glass of:

| | |
|---|---|
| $SiO_2$: | 66–74 weight % |
| $Al_2O_3$: | 0–3 weight % |
| $TiO_2$: | 0–0.15 weight % |
| CaO: | 7–12 weight % |
| MgO: | 2–6 weight % |
| $Na_2O$: | 10–15 weight % |
| $K_2O$: | 0–3 weight % |
| BaO: | 0–0.04 weight % |
| $SO_3$: | 0.1–0.4 weight % . |

In the case of the flat glass with bronze tinting or grey tinting manufactured today which is used for buildings as well as for vehicles, the tinting is customarily obtained by the addition of small quantities of selenium and cobalt of the order of 10 to 50 ppm of selenium and 30 to 40 ppm of cobalt to a usual soda lime silicate glass basic composition. Soda lime silicate glasses have, dependent on their content of $Fe_2O_3$ a yellow or green colour predominance. As a result of the addition of selenium and cobalt, a shift of the spectrum locus in the chromaticity diagram takes place towards the bronze values with dominant wavelengths of 580 nm to 610 nm until the required spectral purity is achieved. A bronze-tinted glass customary on the market (soda lime silicate glass), whose colouration is due to percentages of selenium and cobalt, has the following composition:

| | |
|---|---|
| $SiO_2$: | 70.09 weight % |
| $Al_2O_3$: | 1.39 weight % |
| $TiO_2$: | 0.06 weight % |
| CaO: | 8.09 weight % |
| MgO: | 5.01 weight % |
| $Na_2O$: | 14.11 weight % |
| $K_2O$: | 0.65 weight % |
| BaO: | 0.02 weight % |
| $SO_3$: | 0.22 weight % | the following colourant additives being used:

| | |
|---|---|
| $Fe_2O_3$: | 0.35 weight % |
| CoO: | 0.004 weight % and |
| Se: | 0.005 weight % |

With a thickness of 4 mm, this known bronze-tinted glass has a transmission factor with standard light types A and D65 (DIN 5033) of 55.8% and 53.9% respectively, with total solar radiation (TE-CIE) of 57.8%. The transmission values for UV light are: for the UVA content 16.6%, for the UVB content 0.0% and for UV total radiation 15.8%.

The colour coordinates (achromatic, defined in DIN 5033) are stated as X=56.4, Y=54.3, Z=45.3, and x=0.3616, y=0.3482, z=0.2901 respectively; in addition, L* was determined as 78.7, a* as 5.2, b* as 9.6. The spectral purity is 13.0.

The coordinates x and y define the position of the spectrum locus in the chromaticity diagram which is shown for the glass described in FIG. 1. The spectrum locus is indicated by "*" and the white point by "x". 585.9 nm was determined as the dominant wavelength imparting the colour shade.

(The limits for the colour are for bronze tinting in the ranges of x=0.3333 to 0.3800 and y=0.3333 to 0.3800; for grey tinting in the ranges of x=0.3100 to 0.3600 and y=0.3100 to 0.3600).

For a variety of reasons, the use of selenium is not without its problems. At the temperatures customary in glass melting, it evaporates in proportions of up to 90 weight %. On account of the toxicity of selenium, legislation has specified observance of the maximum permissible emission levels. At present, the selenium emission in Germany may not exceed 1 $mg/m^3$ of waste gas. Thus, efficient filter systems must be provided in the waste gas system of the glass melting furnace.

For these reasons, compositions for selenium-free bronze-tinted or grey-tinted have long been examined for their usability in production plants for flat glass. These contain a manganese oxide as principal colourant substance.

The basic glass composition as well as control of the cooling process are important for colouration. For the invention, it is only the intention to consider soda lime silicate glasses which are fabricated to flat glass under the usual conditions, preferably by the casting or the float process.

From JP-A 52-47 812, a colourless glass is known which can also contain manganese in the form of $MnO_2$ as an alternative to selenium. The content of $MnO_2$ shall in this case not exceed 0.08 weight %.

In GB-A 708,031, the reciprocal effect of colourant additives on the tinting of a soda lime silicate glass is discussed. Here, 0.2 to 1.2 weight % of vanadium pentoxide ($V_2O_5$) is employed to provide ultraviolet absorption, and 0 to approximately 0.45 weight % of $MnO_2$ and traces of iron (up to 0.1 weight %), cobalt, chromium or copper are employed in order to obtain a pink-tinted glass. The proportions of $V_2O_5$ and $MnO_2$ must be matched to one another, as they can affect the colouration.

In Schmidt/Voss "The Raw Materials for Glass Production", 2nd edition (1958), on page 287, a recipe is given for grey-tinted glass (smoked glass) with 4 weight % of $Mn_2O_3$, 2 weight % of $Fe_2O_3$, 1 weight % of NiO and 1 weight % of CuO. For technical reasons, a composition of this type cannot be used for flat glass production.

From U.S. Pat. No. 4,116,704, a grey-brown tinted glass for the production of cooking vessels is known, where the following are present as colourant additives: 0.001 to 0.116 weight % of CoO, 0.037 to 0.0055 weight % of NiO and 0.6 to 0.21 weight % of $MnO_2$. The basic glass, however, is a borosilicate glass.

JP-A 81-41 579 discloses an infrared-absorbent grey-tinted glass with 0.1 to 0.2 weight % of $Fe_2O_3$, 0.001 to 0.004 weight % of CoO, 0.02 to 0.06 weight % of NiO and 0.01 to 0.5 weight % of MnO in soda lime silicate glass with a considerably increased proportion of $K_2O$ which can be in the range of 2.5 to 11.25 weight %.

The recipes stated cannot be used with soda lime silicate glasses of the class described at the beginning. Shifting the $K_2O$ content to values as stated in JP-A 81-41 579, presumably there to increase the refractive index, or in accordance with GB-A 708,031 is not possible without undesirable effects on the glass properties. In the case of flat glasses, the refining process additionally only permits a narrow margin for the oxidation/reduction state of the glass. Nor can the cooling process be utilized as a free parameter for colour adjustment.

The purpose of the invention is to provide a bronze-tinted or a grey-tinted soda lime silicate glass, where the use of selenium is completely dispensed with as a colourant component, but where cost-effective colourant additives are used, manufacture being possible in a production plant as is customary for soda lime silicate glass and its optical properties being the same as those of bronze-tinted glasses or grey-tinted glasses containing selenium which are customary on the market.

This problem is solved in the case of a soda lime silicate glass of the class described at the beginning by the features of the Characterizing Section of Patent Claim 1. Advantageous configurations are the subject of the Subclaims.

According to the invention, it is provided that colourant additives be present in the following proportions:

| | |
|---|---|
| $Fe_2O_3$: | 0–0.45 weight % |
| $V_2O_5$: | 0.0–0.5 weight % |
| $MnO_2$: | 0.5–2 weight % |
| NiO: | 0.0–0.05 weight % |
| CuO: | 0.0–0.1 weight % |
| CoO: | 0.0–0.008 weight % | the sum of the weight percentages of the constituents forming the soda lime silicate glass being 100. Increasing the manganese content over the known ranges makes it possible to achieve colouration, even under redox conditions of the usual sulphate refining in a flat glass melt. Even in the case of pronounced oxidation of the melt due to nitrate addition, it has been found that the high manganese addition is necessary as after refining, only a low content of the manganese is colour-effective. Preferably, the proportion of $MnO_2$ to be added is between 1.0 and 1.7 weight %. It has been found advantageous to provide a proportion of $Fe_2O_3$ in the range of 0.14 to 0.25 weight %.

The invention will be explained in detail below with the aid examples and the enclosed drawings. These show:

EXAMPLE 1

(Bronze-tinted soda lime silicate flat glass, manufactured by the casting process or the float process)

A soda lime silicate glass whose basic composition incorporates the following:

| | |
|---|---|
| $SiO_2$: | 71.91 weight % |
| $Al_2O_3$: | 0.64 weight % |
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | is provided with colourant additives as follows:

| | |
|---|---|
| $Fe_2O_3$: | 0.14 weight % |
| $MnO_2$: | 1.20 weight % |
| NiO: | 0.04 weight % |
| CoO: | 0.002 weight % |

By employing 0.14 weight % of $Fe_2O_3$ and an $MnO_2$ content of 1.20 weight % which is considerably increased in comparison with known glass compositions, as well as nickel, as colourant additives, an $Mn^{2+}/Mn^+$ ratio of 92/8 is achieved even under the close redox conditions of the customary sulphate refining of a melt for production of flat glass, where a proportion of colourant $Mn^+$ adequate for the desired bronze-tinting of the glass is uniformly present in the glass.

With a thickness of 4 mm, this bronze-tinted glass has a transmission factor with the standard light types A and D65 of 53.3% and 51.2% respectively, with total solar radiation (TE-CIE) of 67.3%. The transmission values for UV light are for the UVA content 38.6%, for the UVB content 0.0% and for the UV total radiation 36.8%.

Figure 1:
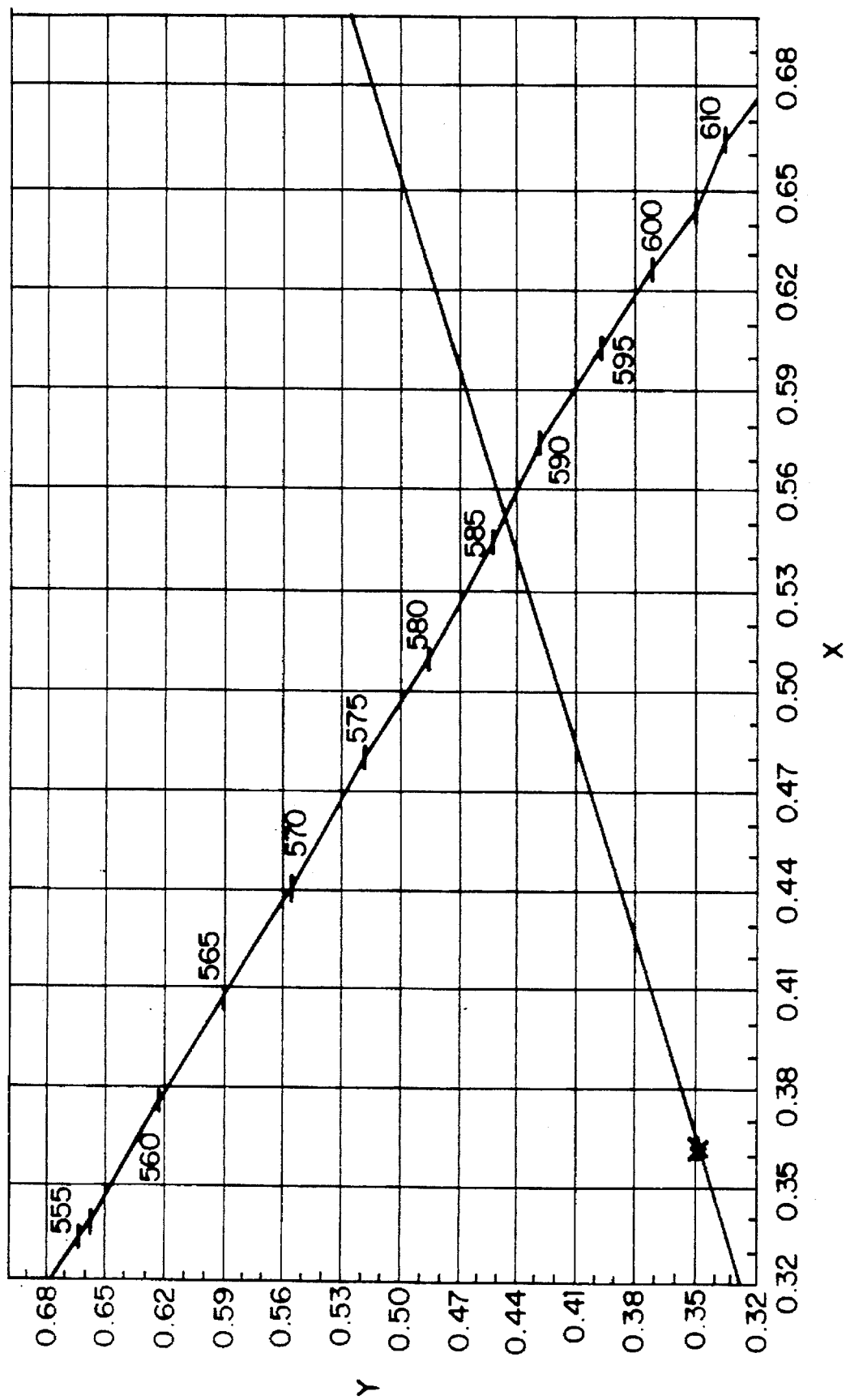
FIG. 1: The position of the spectrum locus in the chromaticity diagram achromatic for seleniumbronze-tinted cast glass customary on the market with a thickness of 4 mm.
Figure 2:
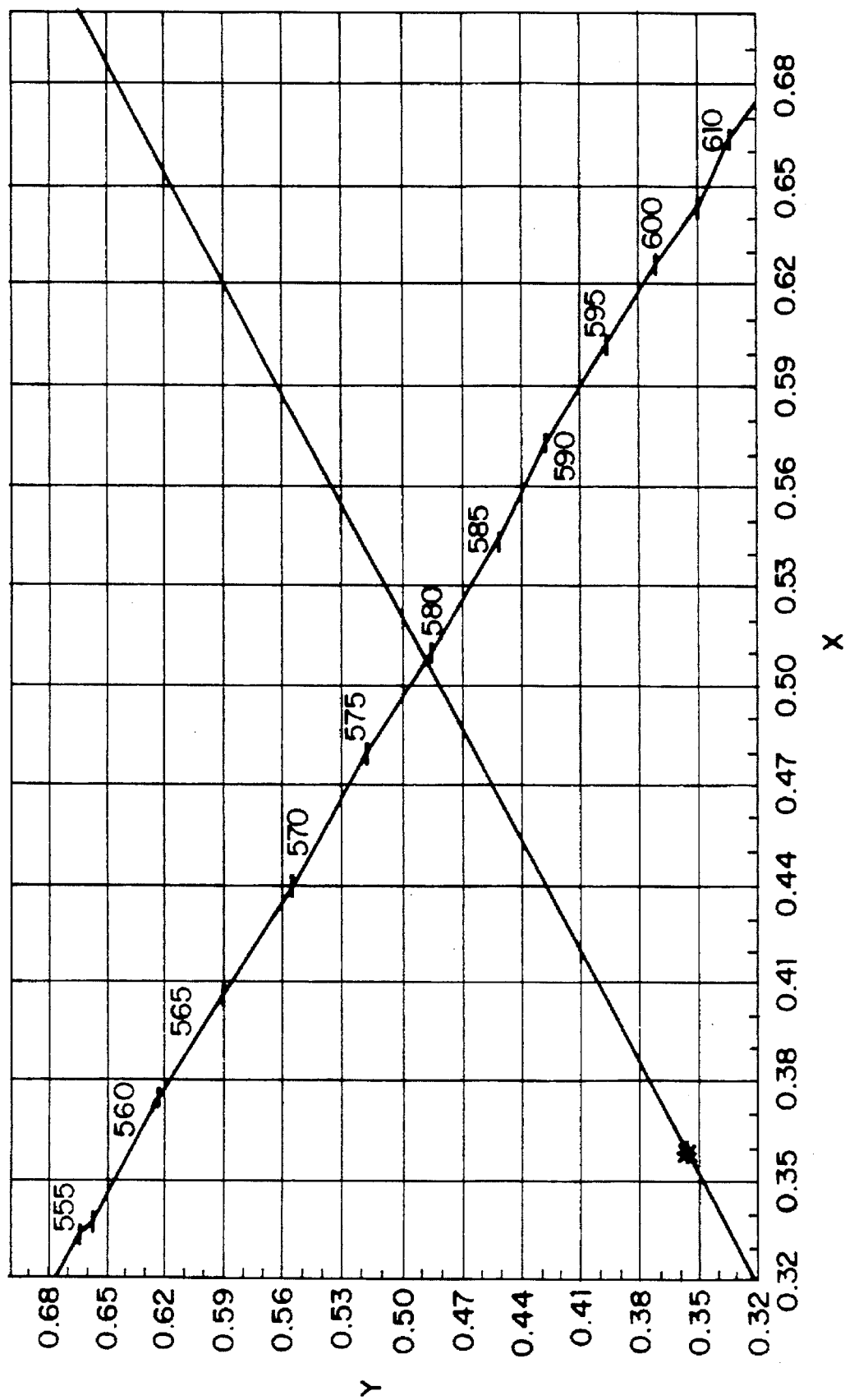
FIG. 2: The position of the spectrum locus in the chromaticity diagram achromatic for soda lime silicate glass with thickness of 4 mm in accordance with Example 1.

The colour coordinates (achromatic) are stated as being X=53.5, Y=51.7, Z=40.0 and x=0.3587, y=0.3561, z=0.2752; in addition, L* was determined as 77.1, a*=4.7, b*=13.2. The spectral purity is 17.6. The position of the spectrum locus in the chromaticity table diagram is shown in FIG. 2 for the glass described above. The spectrum locus is denoted by "*", the white point by "x". 57.5 nm has been determined as the dominant wavelength providing the tint.

EXAMPLE 2

(Bronze-tinted soda lime silicate flat glass, manufactured by the casting process or the float process)

A soda lime silicate glass whose basic composition incorporates the following:

| | |
|---|---|
| $SiO_2$: | 71.86 weight % |
| $Al_2O_3$: | 0.64 weight % |
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | is provided with colourant additives as follows:

| | |
|---|---|
| $Fe_2O_3$: | 0.14 weight % |
| $MnO_2$: | 1.22 weight % |
| NiO: | 0.04 weight % |
| CuO: | 0.04 weight % |

With a thickness of 4 mm, this bronze-tinted glass has a transmission factor with the standard light types A and D65 of 56.9% and 5.2% respectively, with total solar radiation (TE-CIE) of 65.4%. The transmission values for UV light are for the UVA content 35.8%, for the UVB content 0.0% and for the UV total radiation 34.1%.

Figure 3:
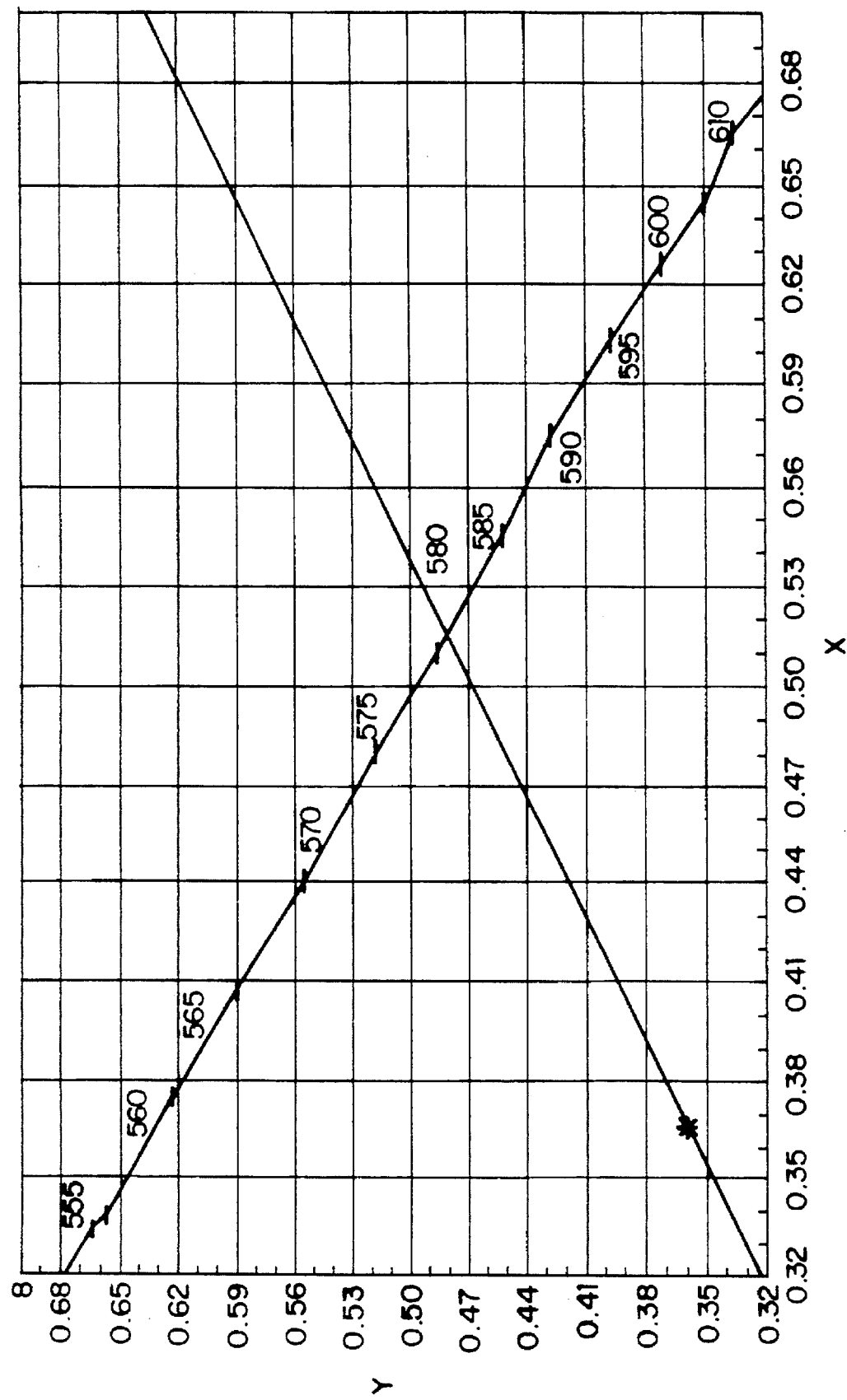
FIG. 3: The position of the spectrum locus in the chromaticity diagram achromatic for soda lime silicate glass with thickness of 4 mm in accordance with Example 2.

The colour coordinates (achromatic) are stated as being X=56.4, Y=55.6, Z=42.4 and x=0.3656, y=0.3600, z=0.2744; in addition, L* was determined as 79.4, a*=2.1, b*=14.2. The spectral purity is 17.9. The position of the spectrum locus in the chromaticity table diagram is shown in FIG. 3 for the glass described above. The spectrum locus is denoted by "*", the white point by "x". 580.5 nm has been determined as the dominant wavelength. The colour coordinates (achromatic) which are desired for a bronze tint are achieved in practice with this composition.

EXAMPLE 3

(Grey-tinted soda lime silicate flat glass, with increased UV-absorption manufactured by the casting process or the float process)

A soda lime silicate glass whose basic composition incorporates the following:

| | |
|---|---|
| $SiO_2$: | 72.26 weight % |
| $Al_2O_3$: | 0.64 weight % |
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | is provided with colourant additives as follows:

| | |
|---|---|
| $Fe_2O_3$: | 0.17 weight % |
| $V_2O_5$: | 0.2 weight % |
| $MnO_2$: | 0.66 weight % |
| CoO: | 0.0045 weight % |

This glass additionally possesses UV-absorbent properties. With a thickness of 4 mm, it has a transmission factor with the standard light types A and D65 of 58.3% and 58.1% respectively, with total solar radiation (TE-CIE) of 59.3%. The transmission values for UV light are for the UVA content 4.0%, for the UVB content 0.0% and for the UV total radiation 3.8%.

Figure 4:
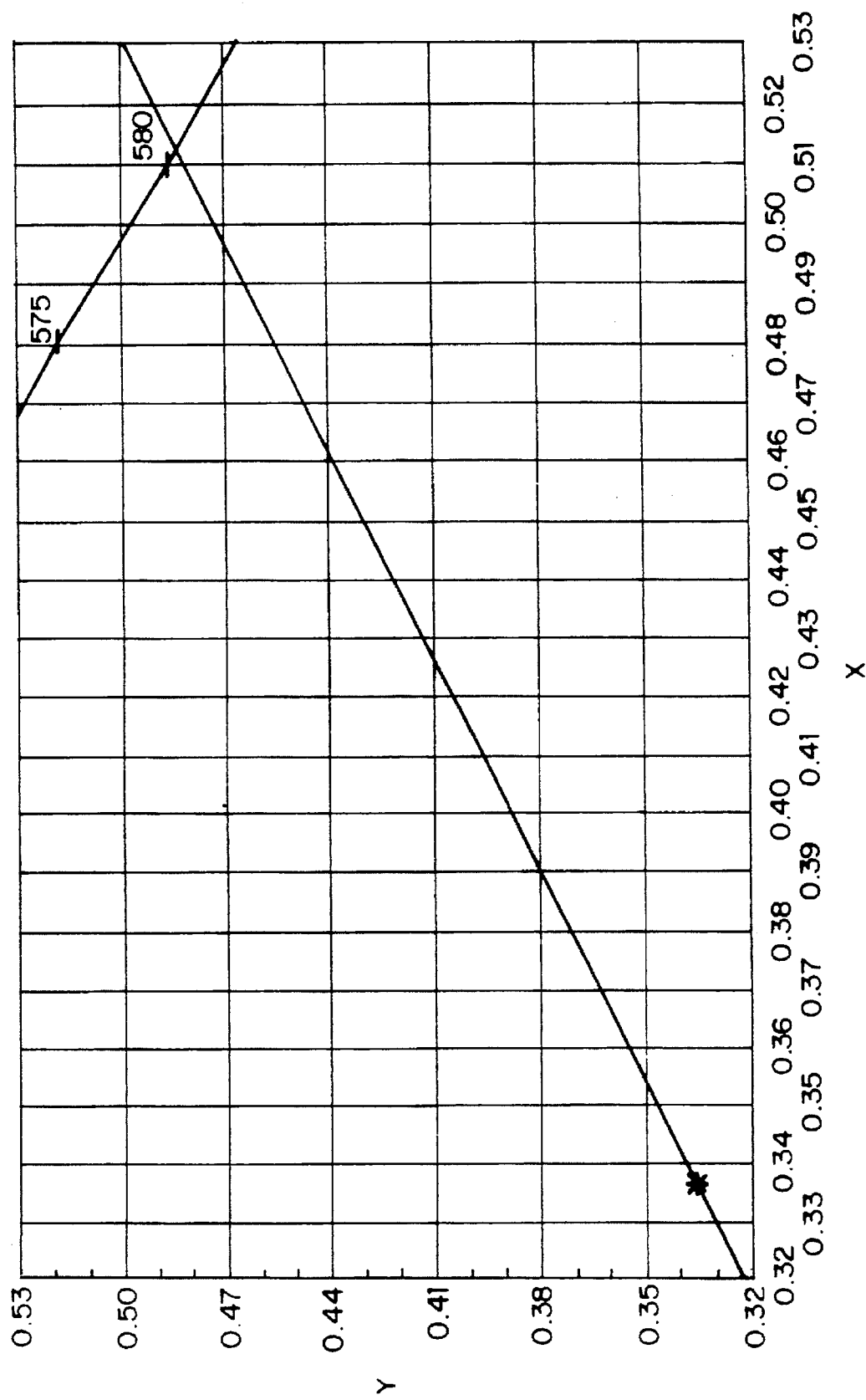
FIG. 4: The position of the spectrum locus in the chromaticity diagram achromatic for soda lime silicate glass with a thickness of 4 mm in accordance with Example 3.

The colour coordinates (achromatic) are stated as being X=58.2, Y=58.1, Z=56.6 and x=0.3365, y=0.3360, z=0.3275; in addition, L* was determined as 80.8, a*=0.2, b*=1.4. The spectral purity is 1.8. The position of the spectrum locus in the chromaticity table diagram is shown in FIG. 4 for the glass described above. The spectrum locus is denoted by "*", the white point by "x". 580.5 nm has been determined as the dominant wavelength.

EXAMPLE 4

(Bronze-tinted soda lime silicate flat glass, with increased UV-absorption manufactured by the casting process or the float process)

A soda lime silicate glass whose basic composition incorporates the following:

| | |
|---|---|
| $SiO_2$: | 72.21 weight % |
| $Al_2O_3$: | 0.64 weight % |

-continued

| | |
|---|---|
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | is provided with colourant additives as follows:

| | |
|---|---|
| $Fe_2O_3$: | 0.17 weight % |
| $V_2O_5$: | 0.2 weight % |
| $MnO_2$: | 0.71 weight % |
| CoO: | 0.0035 weight % |

This glass additionally possesses UV-absorbent properties. With a thickness of 4 mm, it has a transmission factor with the standard light types A and D65 of 52.3% and 51.4% respectively, with total solar radiation (TE-CIE) of 60.6%. The transmission values for UV light are for the UVA content 3.6%, for the UVB content 0.0% and for the UV total radiation 3.5%.

Figure 5:
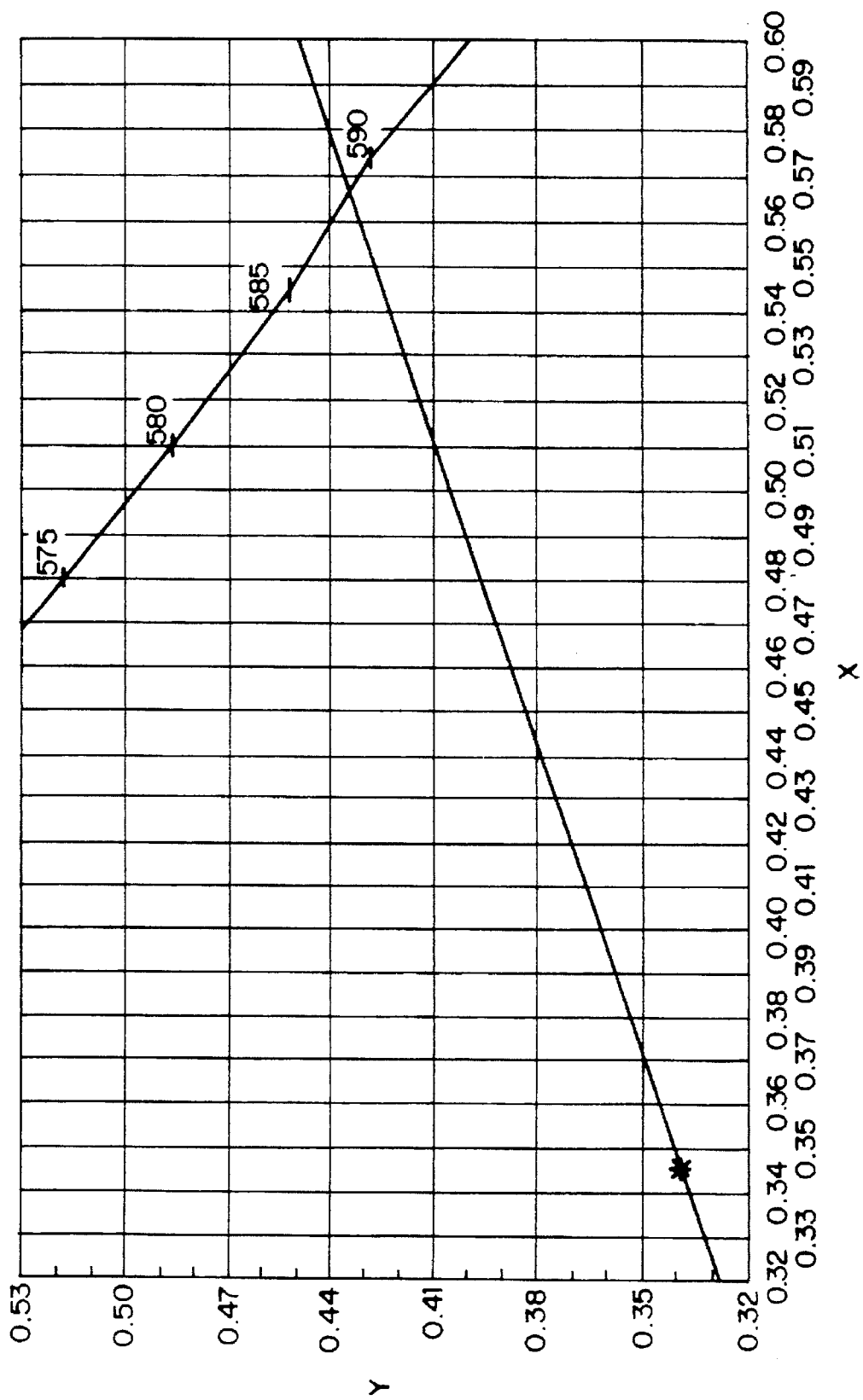
FIG. 5: The position of the spectrum locus in the chromaticity diagram achromatic for soda lime silicate glass with a thickness of 4 mm in accordance with Example 4.

The colour coordinates (achromatic) are stated as being X=52.7, Y=51.6, Z=48.2 and x=0.3455, y=0.3386, z=0.3160; in addition, L* was determined as 77.1, a*=2.7, b*=3.7. The spectral purity is 3.2. The position of the spectrum locus in the chromaticity table diagram is shown in FIG. 5 for the glass described above. The spectrum locus is denoted by "*", the white point by "x". 588.7 nm has been determined as the dominant wavelength.

EXAMPLE 5

(Bronze-tinted soda lime silicate flat glass, manufactured by the casting process)

A soda lime silicate glass whose basic composition incorporates the following:

| | |
|---|---|
| $SiO_2$: | 68.66 weight % |
| $Al_2O_3$: | 1.39 weight % |
| $TiO_2$: | 0.06 weight % |
| CaO: | 8.09 weight % |
| MgO: | 5.01 weight % |
| $Na_2O$: | 14.11 weight % |
| $K_2O$: | 0.65 weight % |
| BaO: | 0.02 weight % |
| $SO_3$: | 0.22 weight % | is provided with colourant additives as follows:

| | |
|---|---|
| $Fe_2O_3$: | 0.23 weight % |
| $MnO_2$: | 1.52 weight % |
| NiO: | 0.033 weight % |
| CoO: | 0.0022 weight % |

With a thickness of 4 mm, this bronze-tinted glass has a transmission factor with the standard light types A and D65 of 55.4% and 53.4% respectively, with total solar radiation (TE-CIE) of 67.7%. The transmission values for UV light are for the UVA content 24.4%, for the UVB content 0.0% and for the UV total radiation 23.3%.

Figure 6:
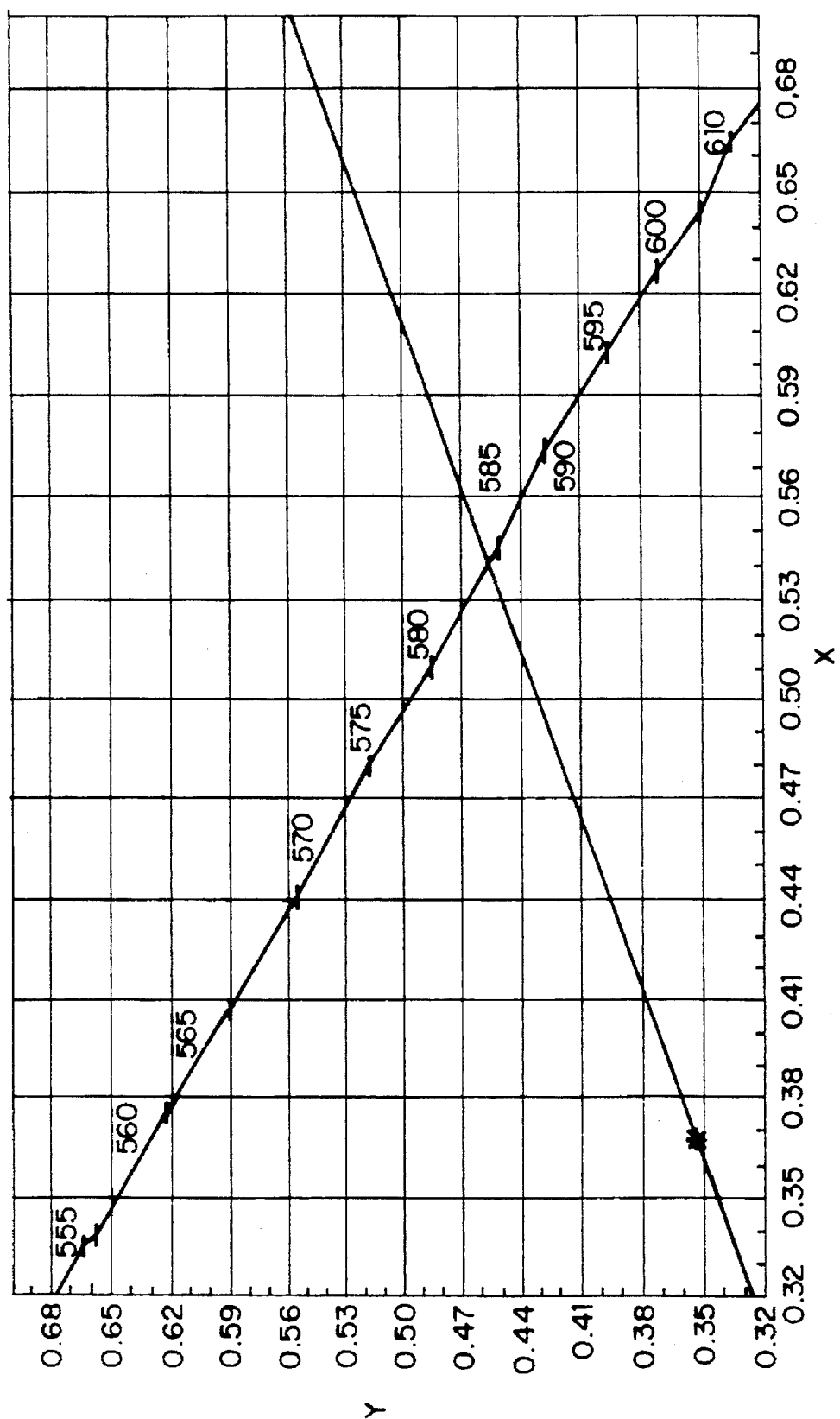
FIG. 6: The position of the spectrum locus in the chromaticity diagram achromatic for soda lime silicate glass with a thickness of 4 mm in accordance with Example 5.

The colour coordinates (achromatic) are stated as being X=55.8, Y=53.9, Z=42.5 and x=0.3668, y=0.3538, z=0.2794; in addition, L* was determined as 78.4, a*=4.9, b*=12.3. The spectral purity is 16.3. The position of the spectrum locus in the chromaticity table diagram is shown in FIG. 6 for the glass described above. The spectrum locus is denoted by "*", the white point by "x". 584.1 nm has been determined as the dominant wavelength.

EXAMPLE 6

(Bronze-tinted soda lime silicate flat glass, manufactured by the casting process)

A soda lime silicate glass whose basic composition incorporates the following:

| | |
|---|---|
| $SiO_2$: | 68.58 weight % |
| $Al_2O_3$: | 1.39 weight % |
| $TiO_2$: | 0.06 weight % |
| CaO: | 8.09 weight % |
| MgO: | 5.01 weight % |
| $Na_2O$: | 14.11 weight % |
| $K_2O$: | 0.65 weight % |
| BaO: | 0.02 weight % |
| $SO_3$: | 0.22 weight % | is provided with colourant additives as follows:

| | |
|---|---|
| $Fe_2O_3$: | 0.23 weight % |
| $MnO_2$: | 1.61 weight % |
| NiO: | 0.027 weight % |
| CoO: | 0.0014 weight % |

With a thickness of 4 mm, this bronze-tinted glass has a transmission factor with the standard light types A and D65 of 51.1% and 48.6% respectively, with total solar radiation (TE-CIE) of 66.7%. The transmission values for UV light are for the UVA content 24.3%, for the UVB content 0.0% and for the UV total radiation 23.2%.

Figure 7:
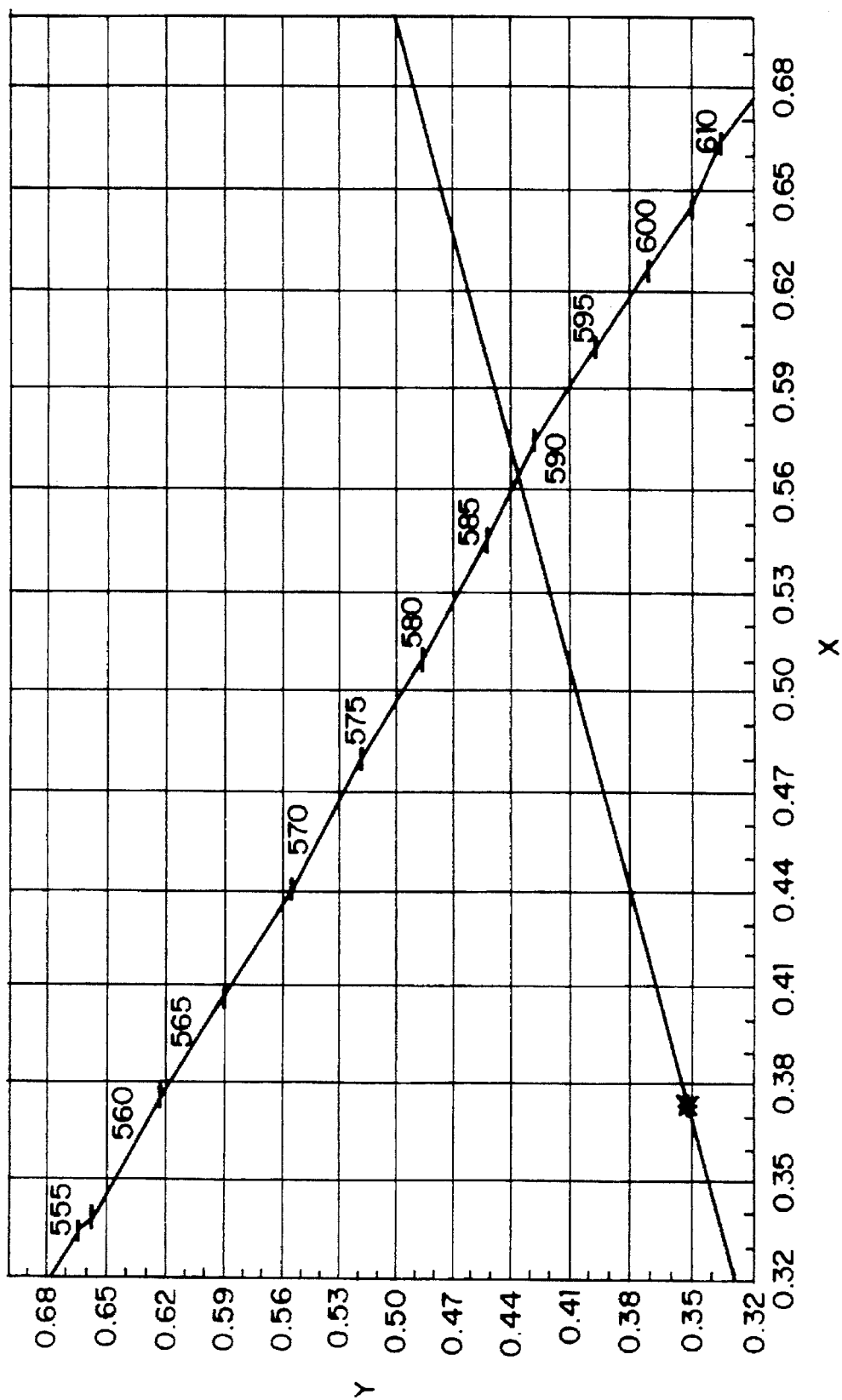
FIG. 7: The position of the spectrum locus in the chromaticity diagram achromatic for soda lime silicate glass with a thickness of 4 mm in accordance with Example 6.

The colour coordinates (achromatic) are stated as being X=52.3, Y=49.2, Z=38.4 and x=0.3736, y=0.3518, z=0.2746; in addition, L* was determined as 75.6, a*=8.0, b*=12.5. The spectral purity is 17.6. The position of the spectrum locus in the chromaticity table diagram is shown in FIG. 7 for the glass described above. The spectrum locus is denoted by "*", the white point by "x". 587.9 nm has been determined as the dominant wavelength.

The Features of the Invention disclosed in the above Specification, in the Drawing and in the Claims can be essential for implementation of the Invention both individually and in any combination.

We claim:

1. Bronze-tinted or grey-tinted soda lime silicate glass having a basic composition for the soda lime silicate glass of:

$SiO_2$ in an amount of 66–74 weight %;
 $Al_2O_3$ in an amount of 0–3 weight %;
 $TiO_2$ in an amount of 0–0.15 weight %;
 CaO in an amount of 7–12 weight %;
 MgO in an amount of 2–6 weight %;
 $Na_2O$ in an amount of 10–15 weight %;
 $K_2O$ in an amount of 0–3 weight %;
 BaO in an amount of 0–0.04 weight %;
 $SO_3$ in an amount of 0.1–0.4 weight %;
and further containing one or more of the following colourant additives:
 $Fe_2O_3$ in an amount of 0–0.45 weight %;
 $V_2O_5$ in an amount of 0–0.5 weight %;
 $MnO_2$ in an amount of 0.5–2 weight %;
 NiO in an amount of 0–0.05 weight %;
 CuO in an amount of 0–0.1 weight %;
 CoO in an amount of 0–0.008 weight %;
wherein the sum of the weight percentages is 100.

2. Soda lime silicate glass in accordance with claim 1, wherein the $Fe_2O_3$ content is in the range of 0.14 to 0.25 weight %.

3. Soda lime silicate glass in accordance with claim 1, wherein the $MnO_2$ content is in the range of 1.0 to 1.7 weight %.

4. Soda lime silicate glass in accordance with claim 1, consisting essentially of:

| | |
|---|---|
| $SiO_2$: | 71.91 weight % |
| $Al_2O_3$: | 0.64 weight % |
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | and colourant additives as follows:

| | |
|---|---|
| $Fe_2O_3$: | 0.14 weight % |
| $MnO_2$: | 1.20 weight % |
| NiO: | 0.04 weight % |
| CoO: | 0.002 weight %. |

5. Soda lime silicate glass in accordance with claim 1, consisting essentially of:

| | |
|---|---|
| $SiO_2$: | 71.86 weight % |
| $Al_2O_3$: | 0.64 weight % |
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | and colourant additives as follows:

| | |
|---|---|
| $Fe_2O_3$: | 0.14 weight % |
| $MnO_2$: | 1.22 weight % |
| NiO: | 0.04 weight % |
| CuO: | 0.04 weight %. |

6. Soda lime silicate glass in accordance with claim 1, consisting essentially of:

| | |
|---|---|
| $SiO_2$: | 72.26 weight % |
| $Al_2O_3$: | 0.64 weight % |
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | and colourant additives as follows:

| | |
|---|---|
| $Fe_2O_3$: | 0.17 weight % |
| $V_2O_5$: | 0.2 weight % |
| $MnO_2$: | 0.66 weight % |
| CoO: | 0.0045 weight %. |

7. Soda lime silicate glass in accordance with claim 1, consisting essentially of:

| | |
|---|---|
| $SiO_2$: | 72.21 weight % |
| $Al_2O_3$: | 0.64 weight % |
| $TiO_2$: | 0.04 weight % |
| CaO: | 8.51 weight % |
| MgO: | 3.82 weight % |
| $Na_2O$: | 13.29 weight % |
| $K_2O$: | 0.18 weight % |
| BaO: | 0.01 weight % |
| $SO_3$: | 0.21 weight % | and colourant additives as follows:

| | |
|---|---|
| $Fe_2O_3$: | 0.17 weight % |
| $V_2O_5$: | 0.2 weight % |
| $MnO_2$: | 0.71 weight % |
| CoO: | 0.0035 weight %. |

8. Soda lime silicate glass in accordance with claim 1, consisting essentially of:

| | |
|---|---|
| $SiO_2$: | 68.66 weight % |
| $Al_2O_3$: | 1.39 weight % |
| $TiO_2$: | 0.06 weight % |
| CaO: | 8.09 weight % |
| MgO: | 5.01 weight % |
| $Na_2O$: | 14.11 weight % |
| $K_2O$: | 0.65 weight % |
| BaO: | 0.02 weight % |
| $SO_3$: | 0.22 weight % | and colourant additives as follows:

| | |
|---|---|
| $Fe_2O_3$: | 0.23 weight % |
| $MnO_2$: | 1.52 weight % |
| NiO: | 0.033 weight % |
| CoO: | 0.0022 weight %. |

9. Soda lime silicate glass in accordance with claim 1, consisting essentially of:

| | |
|---|---|
| $SiO_2$: | 68.58 weight % |
| $Al_2O_3$: | 1.39 weight % |
| $TiO_2$: | 0.06 weight % |
| CaO: | 8.09 weight % |
| MgO: | 5.01 weight % |
| $Na_2O$: | 14.11 weight % |
| $K_2O$: | 0.65 weight % |
| BaO: | 0.02 weight % |
| $SO_3$: | 0.22 weight % | and colourant additives as follows:

| | |
|---|---|
| $Fe_2O_3$: | 0.23 weight % |
| $MnO_2$: | 1.61 weight % |
| NiO: | 0.027 weight % |
| CoO: | 0.0014 weight %. |

* * * * *